(12) United States Patent
Nykamp (10) Patent No.: US 9,836,971 B2
(45) Date of Patent: Dec. 5, 2017

(54) SYSTEMS FOR HEADS-UP DISPLAY OF TRANSIT INDUSTRY VEHICLE INFORMATION

(71) Applicant: Trapeze Software ULC, Mississauga (CA)

(72) Inventor: Richard James Nykamp, Milton (CA)

(73) Assignee: Trapeze Software ULC, Mississauga (CA)

( * ) Notice: Subject to any disclaimer, the term of this patent is extended or adjusted under 35 U.S.C. 154(b) by 53 days.

(21) Appl. No.: 14/972,405

(22) Filed: Dec. 17, 2015

(65) Prior Publication Data
US 2016/0180708 A1 Jun. 23, 2016

Related U.S. Application Data

(60) Provisional application No. 62/092,910, filed on Dec. 17, 2014.

(51) Int. Cl.
| | | |
|---|---|---|
| *G08B 21/00* | (2006.01) |
| *G08G 1/0967* | (2006.01) |
| *G01C 21/36* | (2006.01) |
| *G02B 27/01* | (2006.01) |
| *G08G 1/0968* | (2006.01) |
| *G08G 1/0969* | (2006.01) |
| *B60R 1/00* | (2006.01) |

(52) U.S. Cl.
CPC ......... *G08G 1/096775* (2013.01); *B60R 1/00* (2013.01); *G01C 21/365* (2013.01); *G01C 21/3667* (2013.01); *G01C 21/3691* (2013.01); *G01C 21/3697* (2013.01); *G02B 27/01* (2013.01); *G08G 1/0969* (2013.01); *G08G 1/096716* (2013.01); *G08G 1/096741* (2013.01); *G08G 1/096822* (2013.01); *G08G 1/096844* (2013.01); *G08G 1/096861* (2013.01); *B60R 2300/205* (2013.01); *B60R 2300/406* (2013.01)

(58) Field of Classification Search
CPC ................................................. G08G 1/096775
USPC ........... 340/425.5, 438, 691.6; 345/7; 701/1, 701/400
See application file for complete search history.

(56) References Cited

U.S. PATENT DOCUMENTS

| | | | |
|---|---|---|---|
| 2005/0137933 A1* | 6/2005 | Holsen | G06Q 10/08355 705/338 |
| 2014/0240204 A1* | 8/2014 | Chen | G02B 27/01 345/2.3 |

\* cited by examiner

*Primary Examiner* — Jeffery Hofsass
(74) *Attorney, Agent, or Firm* — Elan IP Inc.

(57) ABSTRACT

Systems for heads-up display of transit industry vehicle information is provided. Information originating from various transit agency systems and arriving at transit industry vehicles may be selectively displayed on a heads-up display. Control and configuration of the information displayed on a heads-up display may be determined by a transit agency and may relate to data displayed on on-board mobile data terminals.

7 Claims, 13 Drawing Sheets

SYSTEMS FOR HEADS-UP DISPLAY OF TRANSIT INDUSTRY VEHICLE INFORMATION

CROSS-REFERENCE TO RELATED APPLICATIONS

This application claims the benefit of U.S. Provisional Application No. 62/092,910, filed Dec. 17, 2014, the contents of which are hereby incorporated by reference.

COPYRIGHT NOTICE

A portion of the disclosure of this patent document contains material which is subject to copyright protection. The copyright owner has no objection to the facsimile reproduction by anyone of the patent document or the patent disclosure, as it appears in the Patent and Trademark Office patent files or records, but otherwise reserves all copyright rights whatsoever.

BACKGROUND

Heads-up display (HUD) is available for various vehicles, presenting typical information to a driver, such as speed, time, gas levels, turn-by-turn driving instructions, and the like. HUD allows a driver to remain focused on the road ahead of them, bringing information to eye level and being displayed on the windshield.

Transit agencies operate transit industry vehicles, such as buses, vans and trains, and operators drive or operate these vehicles. Transit industry vehicles are typically more complicated vehicles, require more complicated operation, and receive (nonGPS) information, often in real-time, from sources external to the transit industry vehicle. Operation of these transit industry vehicles thus often requires the use of mobile data terminals installed in the transit industry vehicles—with screens to interact with the various transit data that an operator of a transit industry vehicle may need to interact with. However HUD for transit industry vehicles, addressing specific operational uses of transit industry vehicles, has not been done.

There thus remains a need for HUD of transit vehicle information for transit industry vehicles.

SUMMARY OF THE INVENTION

There is a system for heads-up display of transit data on a heads-up display on a transit industry vehicle, the system comprising: a projector, operably connected to a mobile data terminal, configured to produce an image on a transit industry vehicle heads-up display located on a windshield of the transit industry vehicle; a mobile data terminal, operably connected to a projector and operable via a mobile data terminal application residing thereon, and configured to communicate a first set of transit data to a projector for display on the transit industry vehicle heads-up display.

The mobile data terminal may be further configured to display a second set of transit data on a mobile data terminal display.

The first set of transit data may comprise manifest data.

The first set of transit data and the second set of transit data may be the same.

The first set of transit data may be a subset of the second set of transit data.

The first set of transit data and the second set of transit data may be the same when the transit industry vehicle is at rest and the first set of transit data may be a subset of the second set of transit data when the vehicle is in motion.

The system may further comprise an operator application configured to enable a supervisor to specify the second set of transit data.

The mobile data terminal may be further configured to enable a first set of one or more user inputs, received via the mobile data terminal by interacting with the first set of transit data, to access a first set of functionality of the mobile data terminal displayed on the transit industry vehicle heads-up display and to enable a second set of one or more user inputs, received via the mobile data terminal, to access a second set of functionality of the mobile data terminal displayed on the mobile data terminal display and.

The first set of user inputs may comprise one or more of steering wheel buttons, located on a steering wheel of the transit industry vehicle, operator gestures, and operator voice commands.

The first set of functionality and the second set of functionality may be the same.

The first set of functionality may be a subset of the second set of functionality.

The system may further comprise an operator application configured to enable a supervisor to specify the first set of functionality.

The first set of functionality may comprise one or more of performing a manifest event, receiving a text message, sending a text message, and viewing a picture of a manifest event location.

The system may further comprise a transit agency server configured to: communicate transit agency data with the mobile data terminal; and wherein the mobile data terminal may be further configured to: receive the transit agency data from the transit agency server; modify the first set of transit data based on the transit agency data; and send mobile data terminal data to the transit agency server.

BRIEF DESCRIPTION OF THE DRAWINGS

The invention is illustrated in the figures of the accompanying drawings which are meant to be exemplary and not limiting, in which like references are intended to refer to like or corresponding parts, and in which.

DETAILED DESCRIPTION OF THE INVENTION

Figure 1:
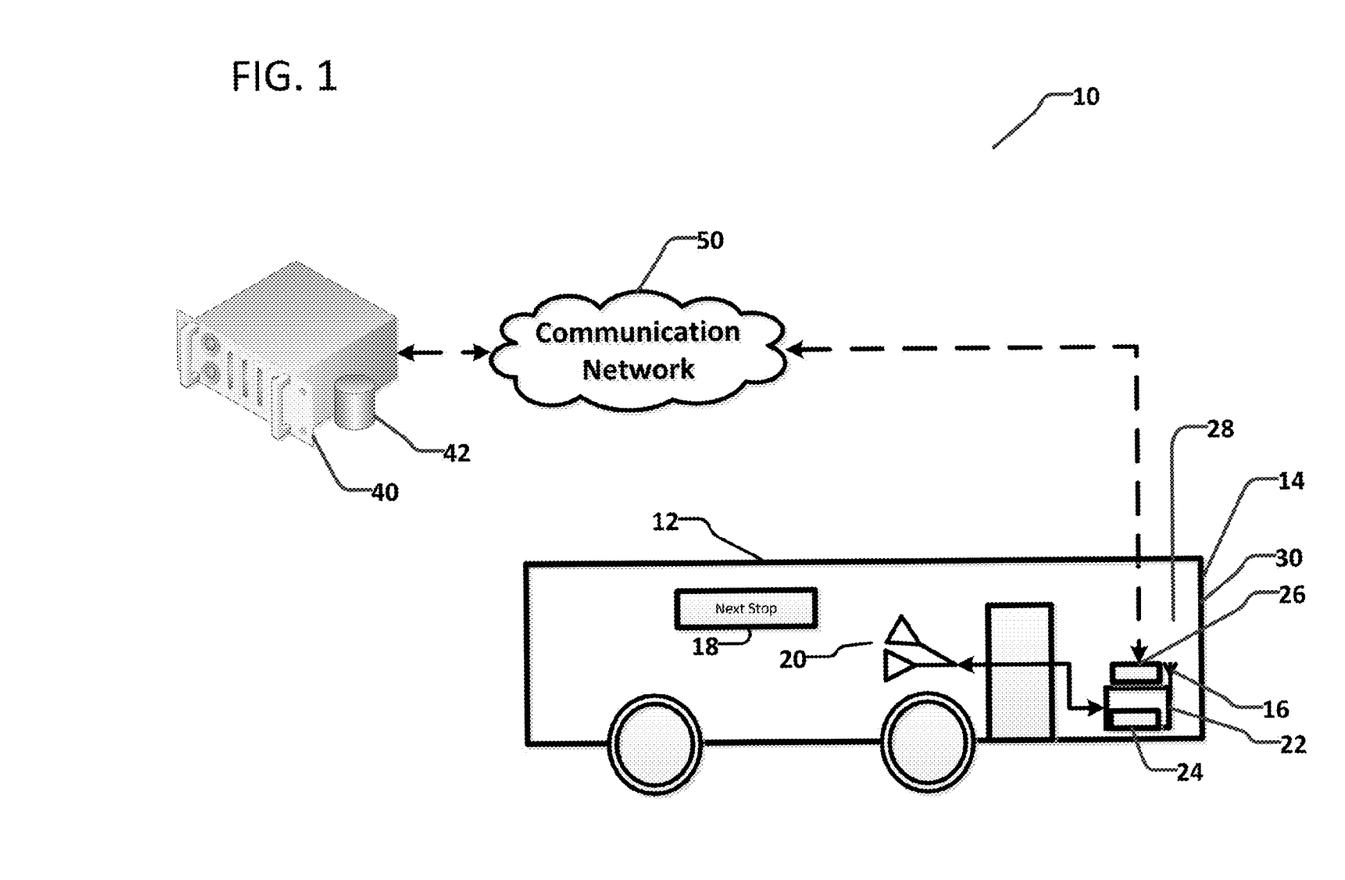
FIG. 1 is a diagram of a system for heads-up display of transit information according to a non-limiting embodiment of the present invention.

FIG. 1 is a diagram of a system 10 for heads-up display of transit information comprising transit industry vehicle (TIV) 12, further comprising windshield 14 with film 30, and dashboard 28, router 16, next stop display 18, one or more TIV inputs/outputs (TIV IO) 20, and MDT 22 further comprising router 16 and MDT application (MDT-A) 24, communication network 50, and transit agency server 40 further comprising transit data database 42.

Transit agency server 40 may be at a transit agency, and may have further systems that form part of the overall system enabling one or more forms of transportation (such as fixed route and demand response transit) for a transit agency. Transit agency server 40 (or MDTs, similar to MDT 22 but optionally operating a supervisor or scheduler application) may allow supervisors or schedulers to determine (such as via scheduling functions), staff (such as via the creation of runs and assigning drivers) and monitor (such as schedule adherence, vehicle safety and performance, and the like) routes, vehicles and other assets and aspects of a transit agency.

Transit agency server 40 may obtain, process, calculate and distribute various transit data and transit information. Obtaining may be from TIVs 12, advertisers, internal calculations or processing, operators, repair shops, and the like. Calculating may include route planning, scheduling, schedule adherence, passenger loads, route determining, and the like (all of which may become transit data). Distributing may be to TIVs 12 and other that elements that may be part of system 10 (such as transit stops, traffic signals, and the like—not shown). Distributing may include transit data being sent to MDT 22 and may include streaming such data, such as via RSS feeds, text or other messages sent to MDT 22 and the like. Transit agency server 40 may provide transit agency software (not shown) which may provide functionality for transit services, including both fixed route and demand response—exemplary transit agency software may include:

PASS-MONTH (MDT Server™)—interface software that enables real-time data communications between TIV 12 and the Trapeze™ PASS scheduling and dispatch system;

PASS™—scheduling and dispatching Fixed Route/Paratransit application developed to support the transportation management efforts of Fixed Route/Demand Response transit services;

Trapeze™ Proxy (Gateway)—is primarily a queue management service, which responds to requests only. The Trapeze™ MDT Server and Trapeze MDC constantly 'poll' this service to retrieve information;

Trapeze Xgate™ (Gateway)—is the link to an agency's MDC's allowing easy communication with Trapeze's (MDTs/MDCs) or new CE-based Stryder/Ranger over a variety of communication networks using a single interface;

Schedule Server™—processes a series of algorithms that create and schedule trips for the PASS™ system; and DriverMate™ (MDC)—Trapeze™ DriverMate for Android devices allows demand response drivers to receive information from and provide information to dispatchers using approved Android devices.

Transit data may include substantially any information that may be used by MDT 22 and MDT-A, whether residing on MDT 22 or not. Transit data may include data from other elements of system 10, such as transit agency server 40 (which may then be called transit agency data, with the transit data being sent from MDT 22 to transit agency server 40 being mobile data terminal data) or may be stored or accessed by MDT 22. Transit data may include scheduling data, route planning data, manifest data, transit network data (such as street closures, emergencies), advertiser data, rider information (profiles, counts, trends), fare data (who has paid, whether correct amounts have been paid, whether each of the riders 52 that just alighted paid their fare, etc), route adherence data (estimated, planned, actual arrival times), route data (next stops, pictures of next stops, turn-by-turn navigation instructions for the route), and the like. Transit data may include pictures, numbers, strings, text and the like and may include (or be able to be made into) user interface elements.

Figure 4:
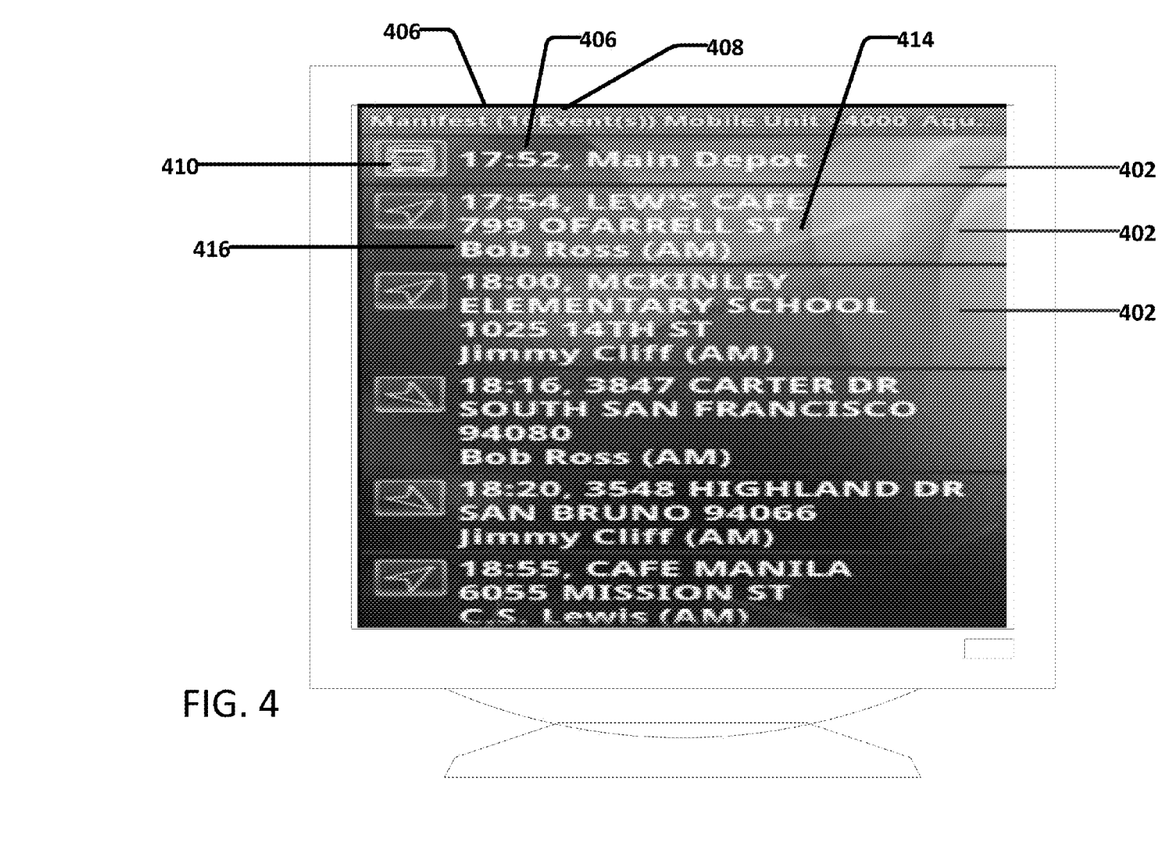
FIG. 4 is a diagram of a manifest for demand response transit according to a non-limiting embodiment of the present invention.

As shown in FIG. 4, a manifest may be made up of manifest data which may comprise one or more manifest events 402, where each manifest event may comprise a manifest identifier 406, a manifest event count 408, an event type 410 (such as start location or end location, arrival or departure, pick up or drop off), an event scheduled time 412 (the time at which the event is to occur, which may be different from when the event does occur), an event performed time (not shown), an event address 414, and a client 416. Manifest events may further comprise space types (such as "AM" ambulatory, "WC" for wheelchair, "SC" for scooter, etc), passengers types or mobility aids, for example (not shown).

Figure 2:
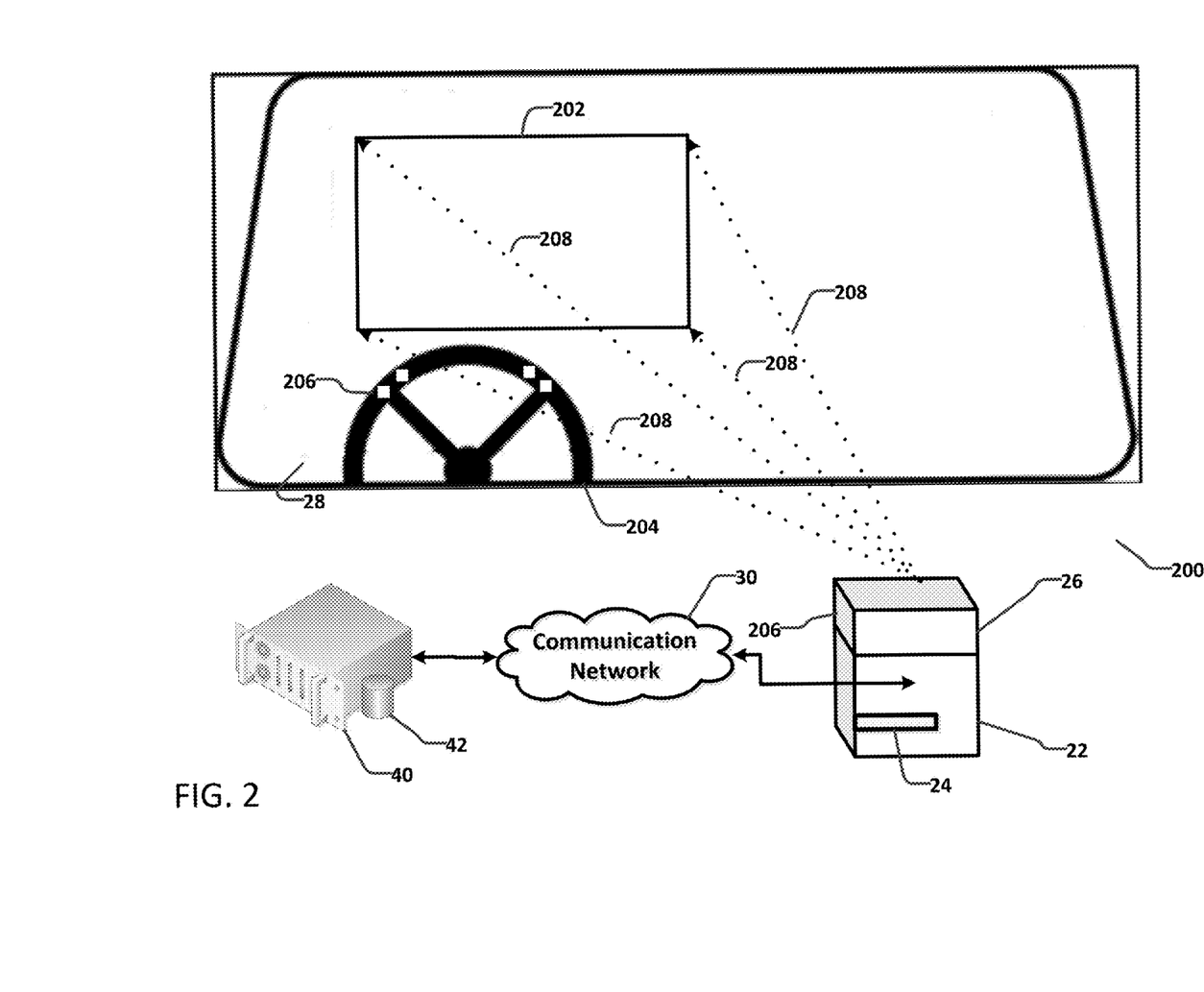
FIG. 2 is a further diagram of a system for heads-up display of transit information according to a non-limiting embodiment of the present invention.

Transit data may further comprise:
(a) Profile/Configuration Information:
   (i) Vehicle Profiles (which may be used by MDT-A to configure display parameters for HUD 202):
      (A) Type of vehicle (van, bus, train);
      (B) Windshield style and size;
      (C) Projector mounting style and details (to ensure proper line of sight, including with side mirrors, maintaining emergency exit access, and the like);
      (D) Preferred layout: transit information and arrangement, height and size of information (may be set for the vehicle or vehicle class, and may be set by or configurable by a transit agency);
      (E) Cable runs (what cabling is required between MDT 22 and projector), brackets for mounting projector and/or MDT 22;
   (ii) Driver/Operator Profiles (for each driver or for the driver that is about to try TIV 12):
      (A) Preferred layout: transit information and arrangement, height and size of information;
   (iii) Operational Characteristics
      (A) Fixed route or demand response;
   (iv) MDT-A Functionality
      (A) A list of functionality/modules offered on MDT-A
         (I) For each module, a setting to determine whether it can be displayed on HUD display 202.

Transit agency server 40 may be implemented via one or more software components (including applications and database components, for example), hardware components (including processors, RAM, ROM and the like), and may be used by one or more transit agencies or fleet operators.

TIV 12 is a vehicle that provides, or relates to the provision of, transit services. TIV 12 may include buses, para-transit vehicles, maintenance vehicles, supervisory vehicles (such as cars or vans driven by supervisors) or a light rail/TRAM vehicles. TIV 12 has many systems running thereon, as known in the art, such as engines, brakes, audio announcement technology (such as transit stop announcements that may be displayed via next stop display 18 or announced via an audio announcement), signage, passenger counting, and the like (each a "TIV System", not shown).

TIV 12 may have a windshield 14 or other front window through which a driver looks at the road in front of TIV 12. Windshield may have properties allowing projector 26 to project HUD display 408 thereon in a manner that is visible. However, TIV 12 may have film 30 applied on windshield 28 to facilitate viewing of HUD display 202. Such film 30 may be thin, plastic, easy to cut, and sticky on one side to adhere to windshield 28 and may comprise one or more fluorescent layers and UV layers that together may form the film, for example each relating to different colors if HUD display 202 is to display color images. Exemplary films may be as developed by Sun™. TIV 12 may also have a dashboard 28 that may be used to mount projector 26. Projector 26 may preferably be a laser projector or other projector that presents clear images, regardless of distance from the projection surface (such as windshield 28 or film 30). Projector 26 may receive transit data to display from MDT 22.

MDT 22 is a computing device that may take TIV I/O 20 and user input (such as keystrokes, clicks, touch inputs, and the like) and provides the user interface to functionality relating to the provision of transit services. MDT 22 may often be located on TIV 12, but may be removable therefrom. Exemplary MDTs 22 include mobile phones, tablets, laptops (that may be running Android™, Windows™ or iOS™ operating systems, for example), ruggedized laptops, vendor specific MDTs (such as Android™, Blackberry™ or Apple™ products). Each of these combinations of vendor and product type (laptop versus smartphone for example) may be considered a hardware platform for MDT 22. Operators of TIV 12, or supervisors, may be some of the primary users of MDTs 22. MDT 22 may communicate with other elements of system 10, for example via communication network 50.

MDT 22 may be operated by a driver of TIV 12. MDT 22 (such as via MDT-A 24) may provide and/or allow a driver to provide the following functionality (noting that some of this functionality may be provided in conjunction with other elements of system 10 such as transit server 20):
  (a) Fixed Route operation:
    (i) Know which route is to be operated, including any changes thereto;
    (ii) Route/schedule adherence data;
    (iii) Performance monitoring (vehicle, such as capacity and mechanical issues, and driver, such as fuel use, jerkiness and the like)
    (iv) Next stop information (pictures thereof, names, estimated arrival times, and the like); Accept an indication from a rider that they wish to alight at the next stop;
    (ii) Perform turn-by-turn transit navigation for a route:
  (b) Demand Response operation:
    (i) Display of a manifest;
    (ii) Performance information about the manifest (ie that manifest events have been performed, that a client was a no-show, and the like);
    (iii) Route/schedule adherence data;
    (iv) Performance monitoring (vehicle, such as capacity and mechanical issues, and driver, such as fuel use, jerkiness and the like);
    (v) Perform turn-by-turn transit navigation for a manifest;

MDT-A 24 is an application residing on MDT 22. MDT-A 24 largely controls MDT 22, including its operation and communication with other aspects of system 10. MDT-A 24 may be configured to present one or more screens (which may include output and input user interface elements) to a user of MDT 22, or otherwise accept or provide input or output (such as via sounds, vibrations, and the like) to enable to functionality described herein.

In one embodiment, that may be useful for demand response transit, MDT 22 is an Android tablet such as a Samsung Galaxy Tab 4™ or Samsung Galaxy Note 3™, MDT-A is DriverMate™ by Trapeze, projector 26 is a laser projector from MicroVision™ and the laser projector is mounted on dashboard 28 of TIV 12. Alternatively MDT 22 may be Trapeze's™ Ranger™ product.

In one embodiment, that may be useful for fixed route transit, MDT 22 is an Android tablet such as a Samsung S4™ or Samsung S3™, MDT-A is TransitMaster by Trapeze, projector 26 is a laser projector from MicroVision™ and the laser projector is mounted on dashboard 28 of TIV 12.

MDT 22 may communicate with TIV IO 20—such as by polling TIV IO 20 to "listen" for communications thereto or therefrom, and the like, and as known to those of skill in the art. Communication may be wired or wireless. Communication may allow TIV IO 20 to be controlled, monitored, and the like, such as by reading values associated with TIV JO 20, receiving statistics or system information therefrom, or setting values or otherwise controlling TIV IO 20. Communication between TIV I/O 20 and MDT 22, may be wired (such as Ethernet, RS232 and the like) or wireless (such as infrared, Bluetooth™, WLAN, cellular, and the like) and may be via VAN 14 and/or router 16.

TIV IO 20 may be any inputs and/or outputs that communicate with, or form part of, any systems that are part of, or incorporated with, TIV 12. TIV IO 20 are able to communicate with other systems and/or computing devices, such as via wired or wireless communication paths or communication networks. TIV IO 20 may be wired into MDT 22 or intermediary hardware (not shown but that may then communicate with MDT 22) or may communicate wirelessly to one or more MDT 22. Exemplary TIV IO 20 may include an odometer, GPS, modem (for TDMA or CDMA communications), engine controllers, automated passenger counters (APC), American Disability Act (ADA) signs (such as next stop display 18) and head signs, fare collection systems (AFC—Automatic Fare Collection which may work with APC and MDT 22 to display to driver/operator whether correct fares have been paid on HUD display 202), traffic signal priority (TSP) systems, audio and video systems, or discrete inputs (that may or may not be part of one or more of the above TIV TO). Discrete inputs may require an "on" or "off" signal, such as limit switches, selector switches or relay contacts. TIV IO 20 may have values (numeric, discrete, etc) that may be polled and set or controlled via MDT 22.

Communication network 50 may be substantially any public or private network, wired or wireless, and may be substantially comprised of one or more networks that may be able to facilitate communication between themselves. Router 16 may form part of MDT 22 and may allow MDT 22 to communicate with system 10 via communication network 50.

FIG. 2 is a further diagram of a system for heads-up display of transit information. HUD display 202 may be presented in any location and sizing in windshield as desired and projector may be set so that beam edges 208 result in displaying on film 30 or a desired portion of windshield 28.

MDT 22 may have a touchscreen that allows a driver/operator to access functionality of MDT 22 and system 10. However it may not be advisable for MDT 22 to be touched during operation of TIV 12. At the same time, aspects of the functionality of MDT 22 may be desirable for driver/operators to access during operation.

Driver/operators may thus interact with functionality of MDT 22 via gestures (where a camera or other motion detection system, such as Xbox Kinnect™), or auditory commands (via a microphone on MDT 22 or a separate headset that may be worn by driver). The functionality accessible via gestures or auditory commands may be limited to functionality related to what is displayed on HUD display 202 (which may be limited or a subset of functionality available on MDT 22, as described herein). Gestures, auditory commands, steering wheel buttons 206 may all be ways (user inputs or user interfaces) for an operator to access functionality (for example that may be displayed on HUD display 202), as may be touchscreen portions of MDT 22 (though such may enable access to functionality shown on MDT display screen 210).

Steering wheel 204 may be substantially a normal steering wheel or may have one or more steering wheels buttons 206 located thereon to access functionality of MDT-A via HUD display. Although many buttons may be provided, it may be desirable to limit the complexity of buttons, and accessible functionality, to ensure driver safety. In one embodiment the top left of steering wheel 204 may have a button 206 for "Arrive" and one button 206 for "Perform" to allow the Driver/Operator to indicate when they arrive and depart from an event on MDT-A and the top right of steering wheel 204 may have a further button 206 for "select" and a further button 206 for "return". Of course many numbers and positions for buttons. Steering wheel buttons may be connected to MDT 22 directly or via one or more other elements of system 10 and may allow MDT 22 to enable access to functionality on HUD display 22.

Various gestures may be used to access functionality of MDT 22 on HUD display 202. Exemplary gestures and functionality may include:

| | Gesture |
|---|---|
| Functionality - General | |
| Anything that can be accomplished via touching MDT 22 | "Touch" an icon, reaching toward HUD display 202 |
| Turn off HUD display | Move arm from high to low |
| Turn on HUD display | Move arm from low to high |
| Functionality - Fixed Route | |
| | Arrive - 2 fingers move from left to right |
| | Perform - 2 fingers move from top to bottom |
| Functionality - Demand Response | |
| | Arrive - 2 fingers move from left to right |
| | Perform - 2 fingers move from top to bottom |

Figure 3A:
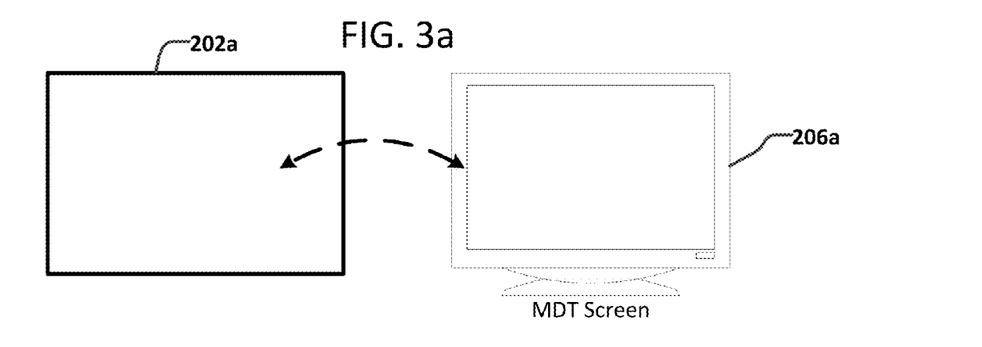
FIGS. 3a-c are diagrams of synching options between screens in a system for heads-up display of transit information according to a non-limiting embodiment of the present invention.
Figure 3B:
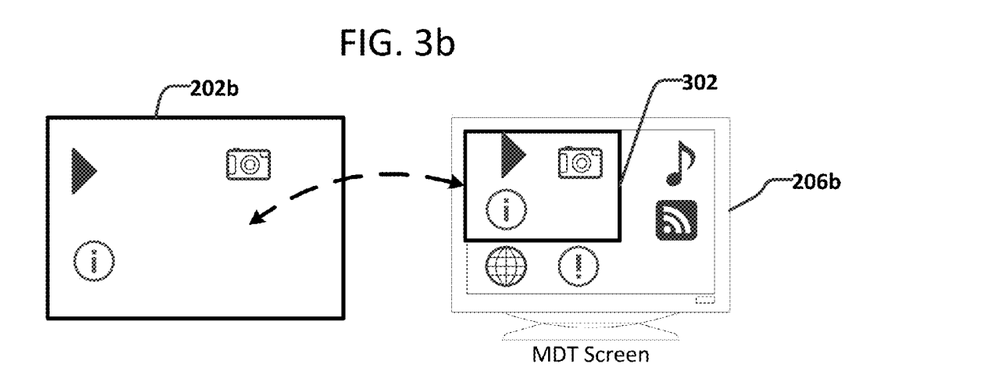
Figure 3C:
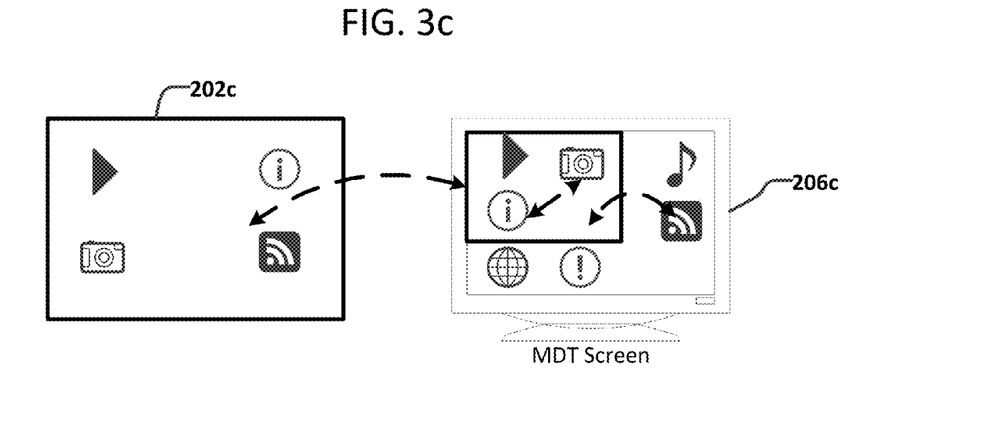

FIGS. 3*a-c* are diagrams of synching options between screens in a system for heads-up display of transit information. Transit data on MDT screen 210 may be one set of transit data (including data and user interface elements to show or depict such data) and transit data on HUD display 202 may be another set of transit data (again, including data and user interface elements to show or depict such data).

In FIG. 3*a* what is shown on MDT screen 210*a* is simply replicated on HUD display 202*a* (in that transit data on MDT screen 210*a* is the same as transit data on HUD display 202*a*). It should be noted that what is shown on MDT 22 can be controlled so that safe operation of TIV 12 occurs; thus when screens are simply replicated safety may be ensured (for example transit data on MDT screen 210*a* may be the same as transit data on HUD display 202*a* when TIV 12 is not in motion or operation but different, in that it may be a subset, when TIV 12 is in motion). MDT screen 210*a* may be on HUD display 202*a*. Or HUD display may contain some information that is not on MDT screen or is a subset thereof. For example, from a manifest, only the next item on the manifest may be on HUD display 202*a*, and only the map/directions to the next item on the manifest may be on HUD display 202*a*. Other data, such as text messages, may only be displayed on HUD display 202*a* (or may only be displayed on HUD display 202*a* when TIV 12 is in operation, meaning that MDT 22 may not be in use or may only offer limited functionality).

In FIG. 3*b* MDT screen 210*b* may have synching area 302 and any icons or transit information that is displayed therein may be replicated on HUD display 202*b*.

In FIG. 3*c* MDT screen 210*c* may have synching area 302 that allows icons therein to be moved around so that HUD display 202*c* is also changed. This may be due to a driver's preference or a supervisor/scheduler, or as described herein.

What is shown on HUD display 202 may be highly configurable, as described herein, and may vary based on:

(a) The type of vehicle;

(b) The driver/operation and their qualifications and abilities; and (c) The service being provided (fixed route versus demand response for example).

Figure 5:
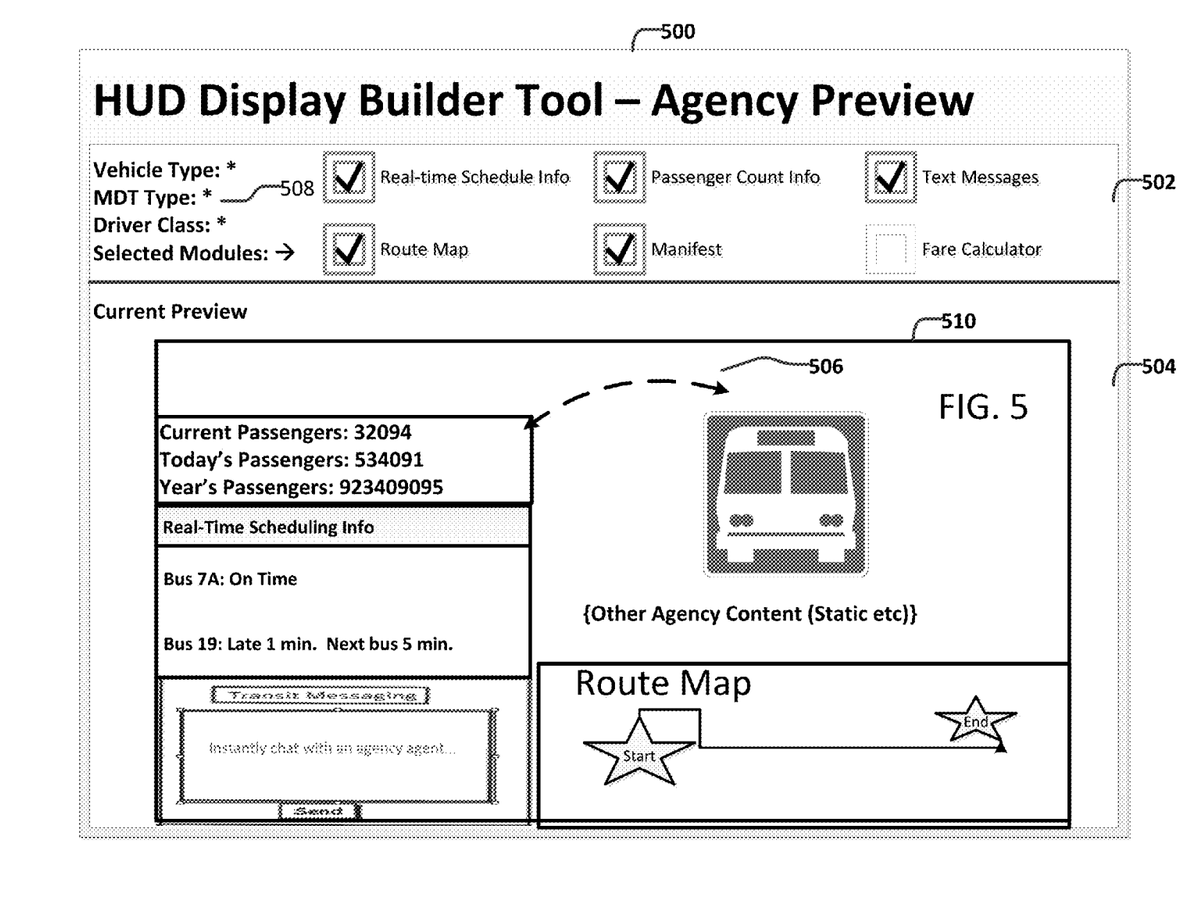
FIG. 5 is a diagram of a user interface for creating heads-up display layouts according to a non-limiting embodiment of the present invention.

In one embodiment of the present invention an application may allow a supervisor or other super-user (such as a supervisor or admin of the transit agency) to determine what is to be shown on HUD display 202, for each vehicle in their fleet. This may be done via one or more user interface (UI) screens, such as UI screen 500 in FIG. 5, that they may access on a MDT (such as a supervisor MDT via a supervisor or operator application) or via interacting with transit agency server 40. A HUD display layout 510 (as shown in current preview portion 504) may apply to a particular filtered set of TIVs 12/classes/drivers etc, via one or more HUD display layout filters 508. A user may select which functionality or icons they wish to put on HUD display layout 510 via one or more checkboxes, where the options may be determined automatically with reference to the particular filters selected (for example if TIV 12 or TIV class does not have passenger counters, nor does MDT 22, then "Passenger Count Info" will not be an option). Having selected one or more functionalities that are desired a user can manipulate their size and layout by dragging and dropping and the like, as shown by arrow 506. Alternatively, this type of control may be maintained or performed by a supervisor or other transit agency person so that driver/operator is not able to render HUD display visually distracting or ineffective.

In one embodiment HUD display 202 may display a map or manifest when TIV 12 is in motion and lock functionality, which may be substantially similar to operation of MDT 22.

In a further embodiment, MDT-A (such as DriverMate™) may appear on the MDT and only display the most relevant information onto HUD display 202. For example, the entire manifest may be displayed on MDT 22 but only the next event is displayed on HUD display 202. When TIV 12 is in motion, show the map on HUD display 202 while leaving the manifest locked on MDT 22. Display changes on the HUD may include, but are not limited to: Trip Changes, Trip Insertions, Trip Updates, Trip Removals/Cancelations, Text Messages, Mapping/Navigation/Traffic/Streets View, and Incoming VoIP Calls.

Of course it is to be understood that many different approaches to filtering, designing and amending such layouts are possible.

Figure 6A:
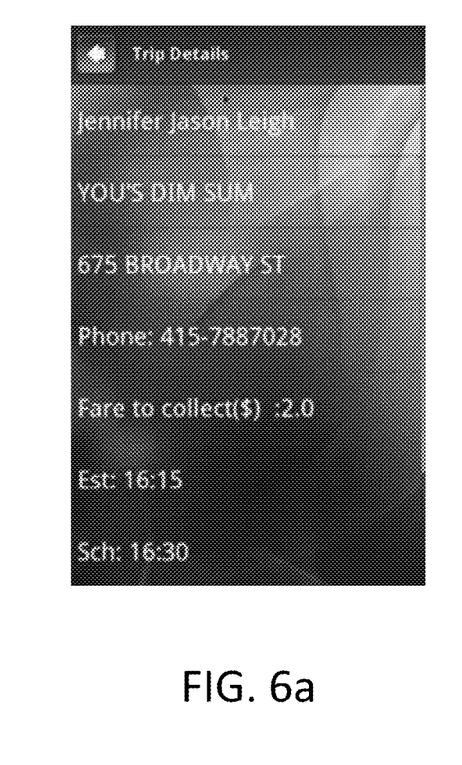
FIGS. 6a-c, 7a-c, 8a-b, 9a-b, 10, 11a-c, and 12 are screenshots of screens and functionality that may be displayed on MDTs and selectively displayed on heads-up displays according to a non-limiting embodiment of the present invention.
Figure 6B:
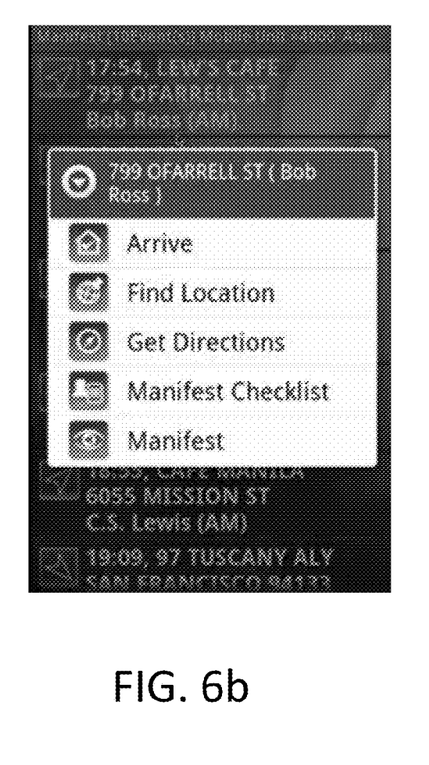
Figure 6C:
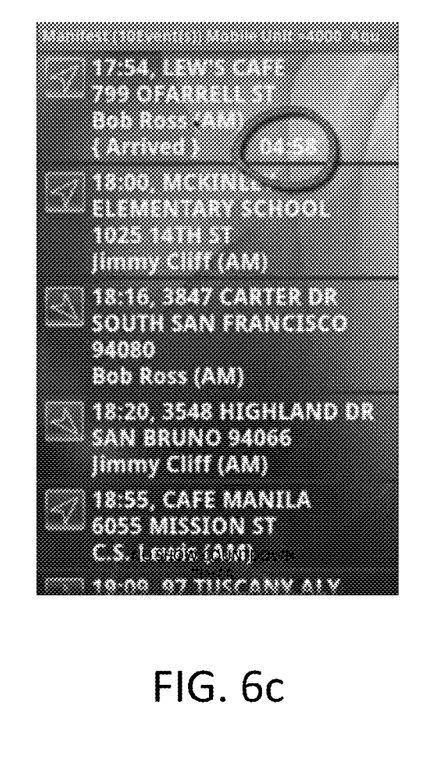
Figure 7A:
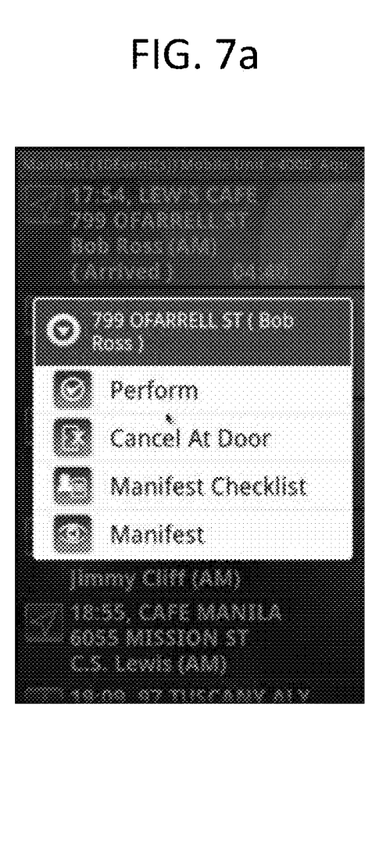
Figure 7B:
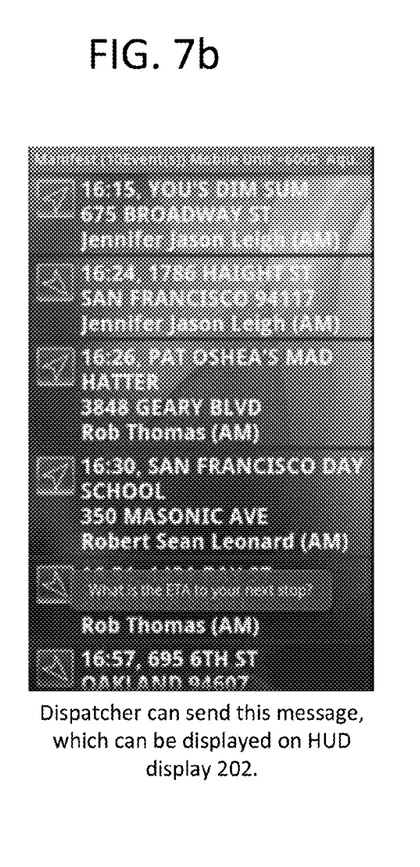
Figure 7C:
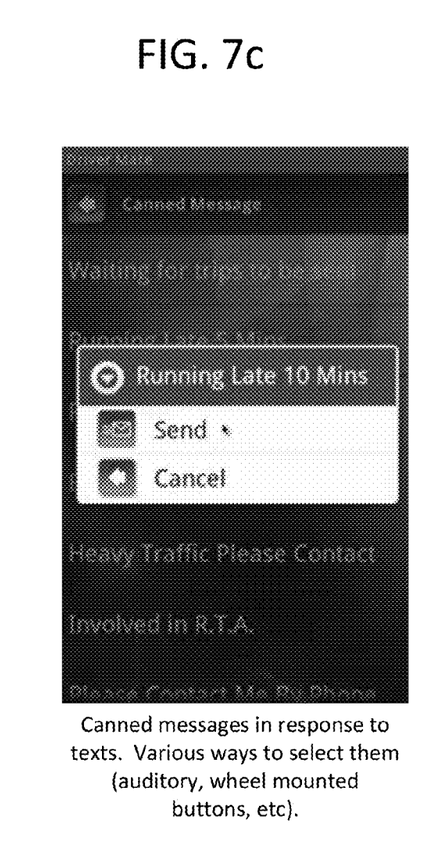
Figure 8A:
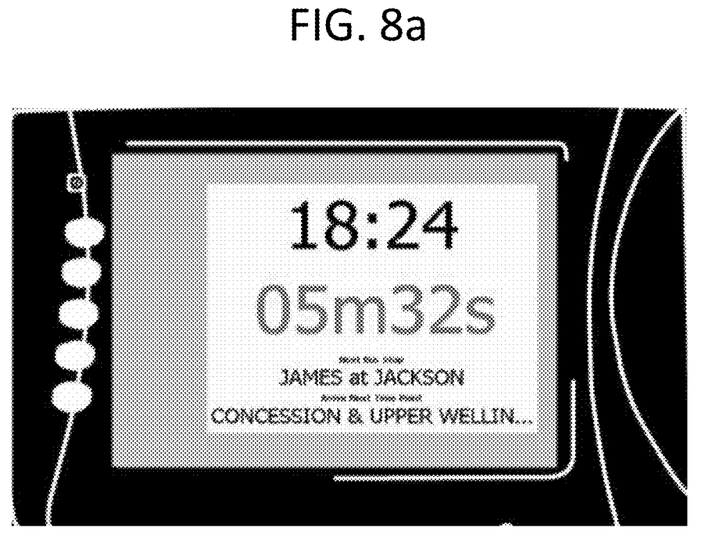
Figure 8B:
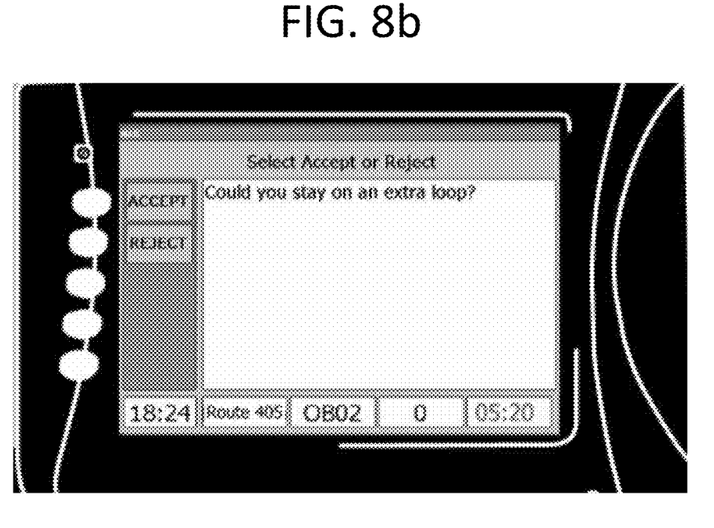
Figure 9A:
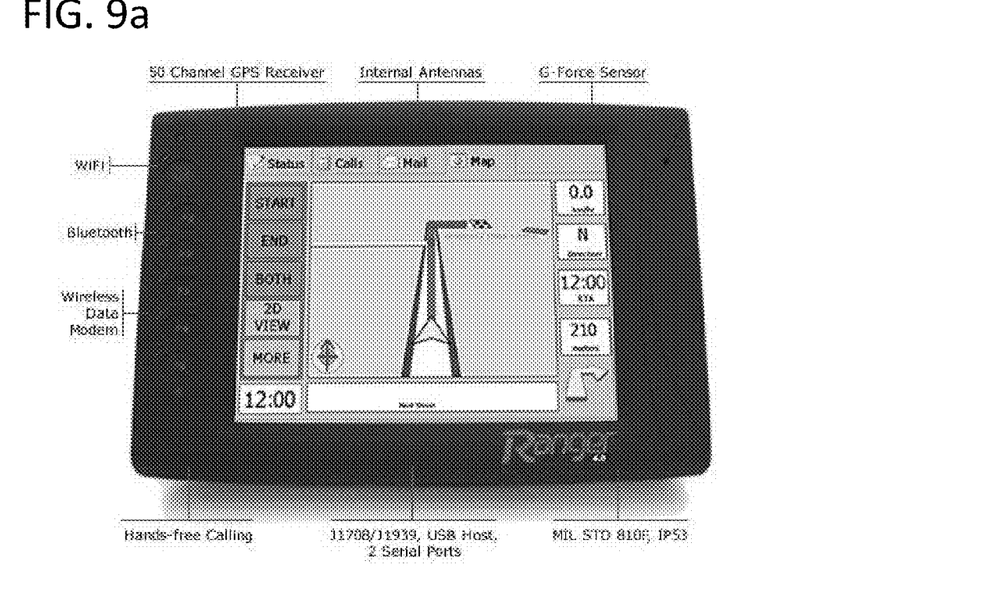
Figure 9B:
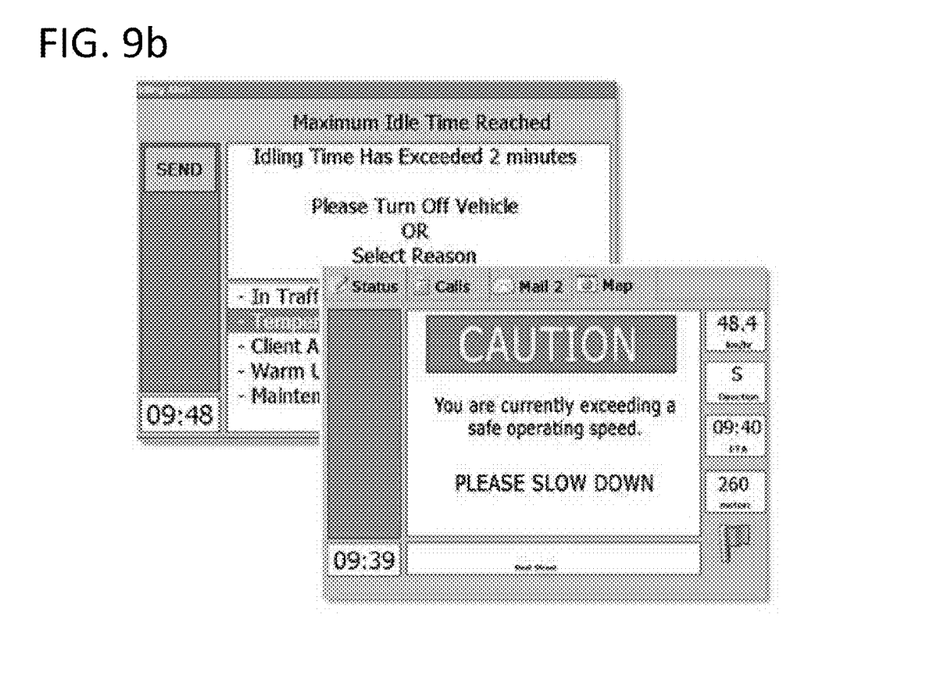
Figure 10:
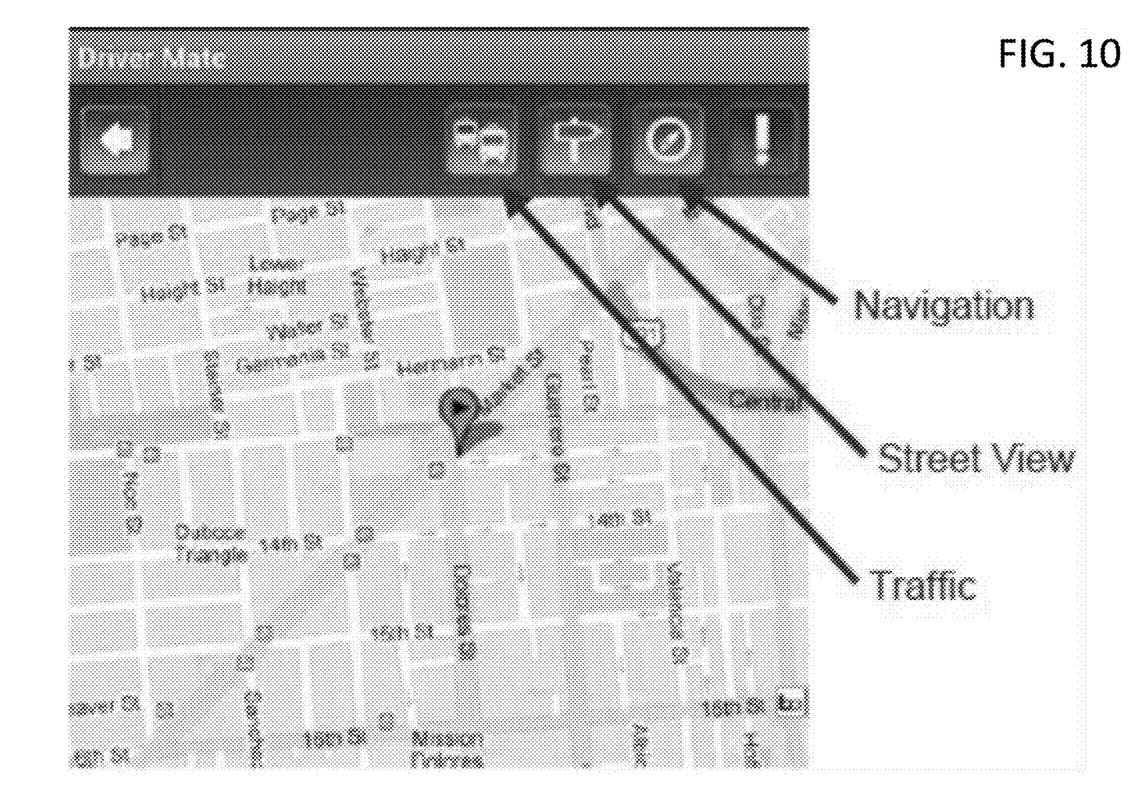
Figure 11A:
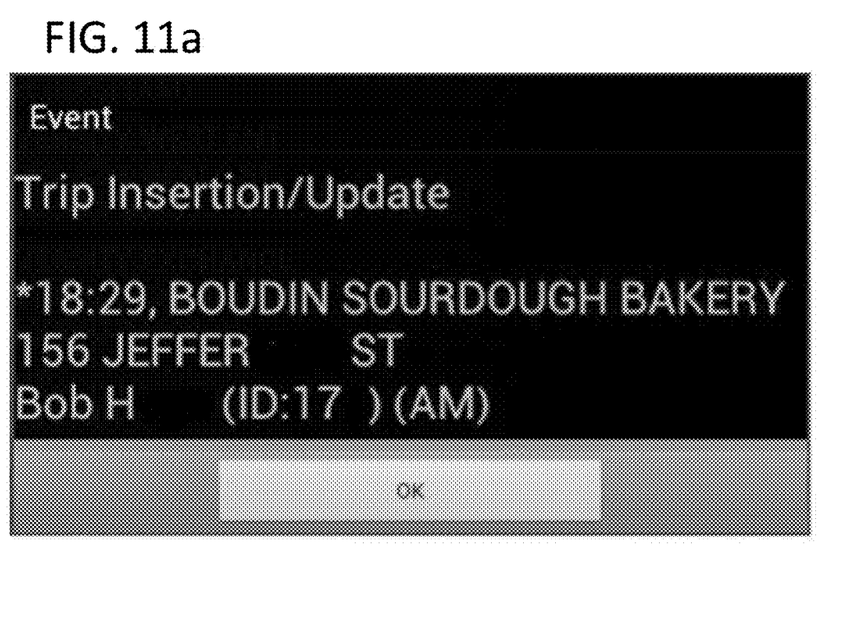
Figure 11B:
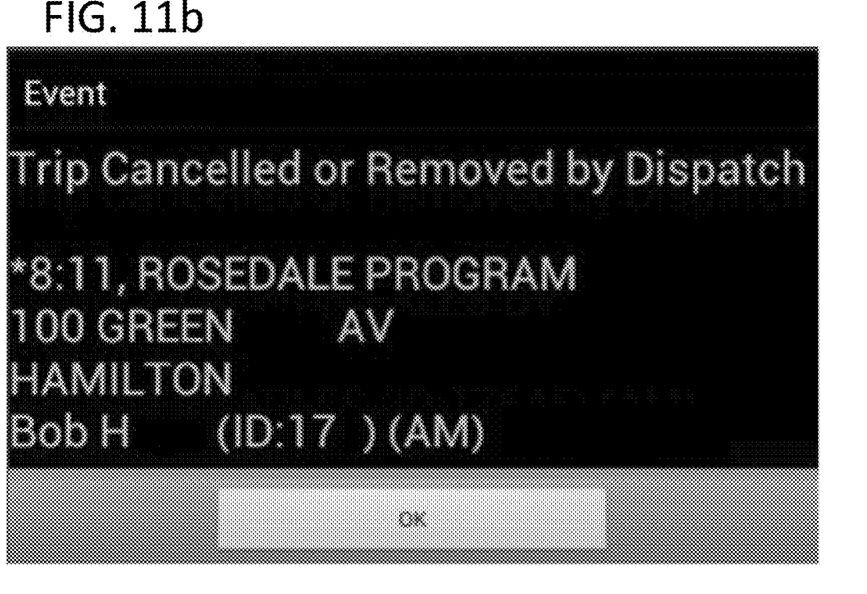
Figure 11C:
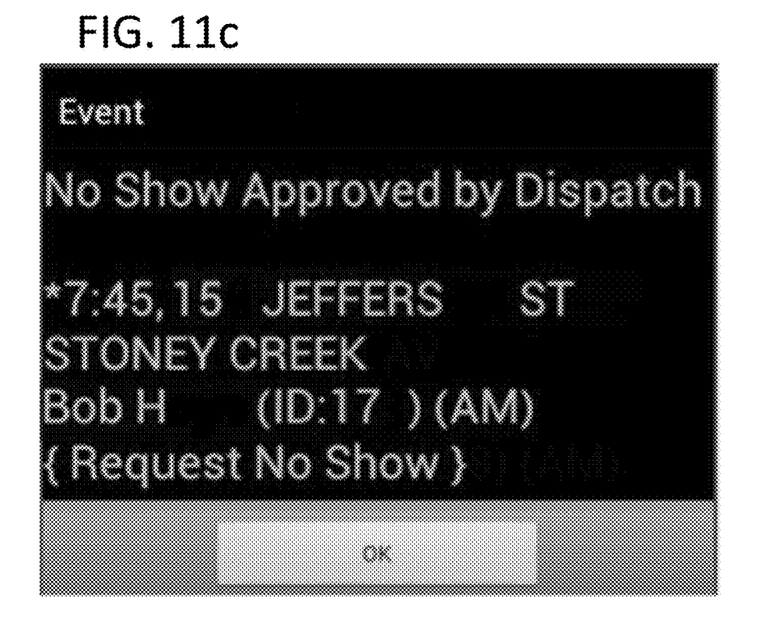
Figure 12:
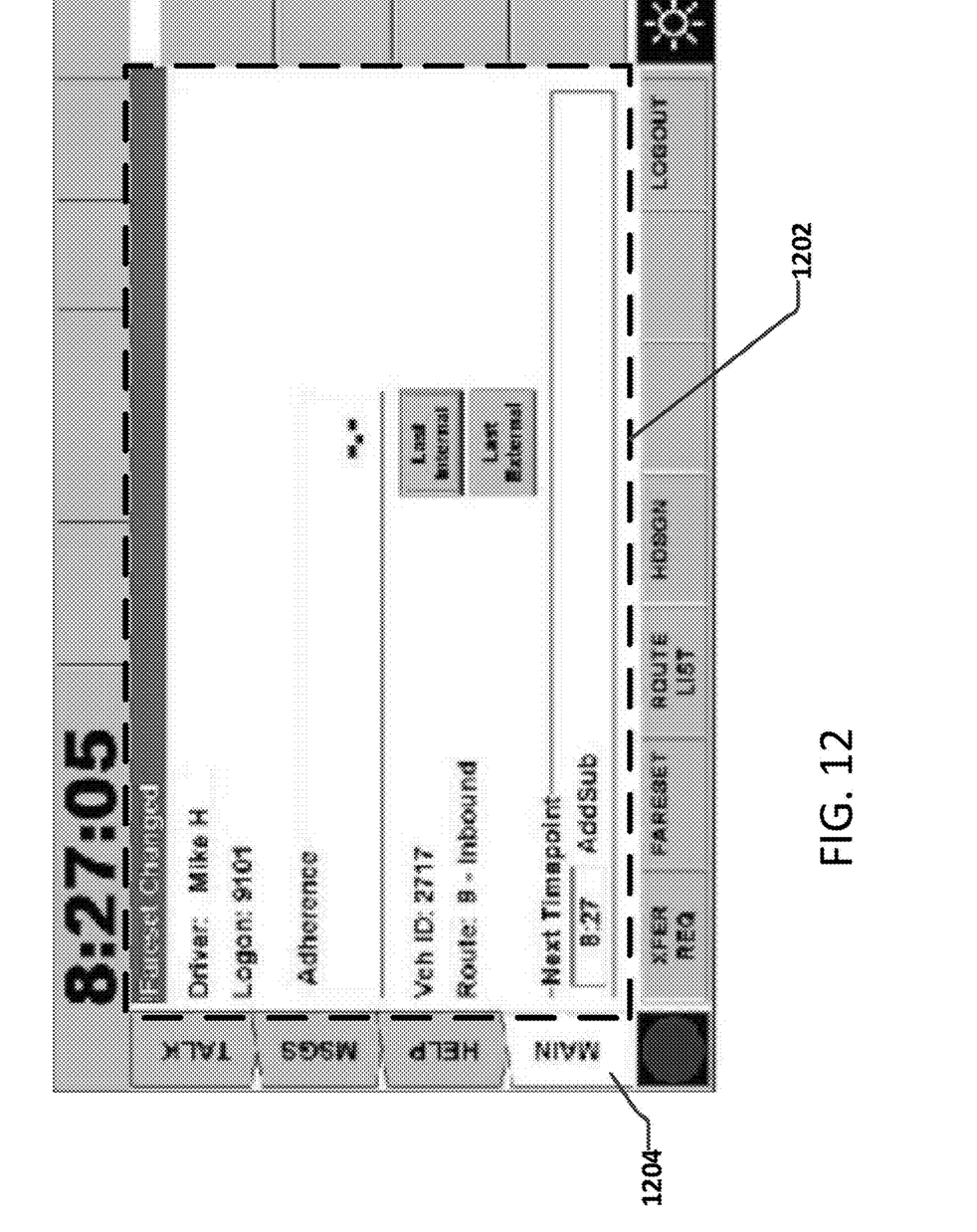

FIGS. 6a-c, 7a-c, 8a-b, 9a-b, 10, 11a-c, and 12 are screenshots of screens and functionality that may be displayed on MDTs and selectively displayed on heads-up displays. The screenshots and functionality are exemplary only and although particular functionality is displayed on a screenshot relating to fixed route it may also apply to demand response, as appropriate. In particular:

(a) FIG. 6a: shows a more detailed manifest event screen;
(b) FIG. 6b: shows options for a driver relating to a manifest event;
(c) FIG. 6c: shows a countdown timer that may be displayed, that must reach zero before a driver can determine that a rider is a no-show, or a timer that tells the driver to turn off their engine if they are idling;
(d) FIG. 7a: shows further options for a driver relating to a manifest event;
(e) FIG. 7b: shows a text or other message that may be sent to MDT 22 and/or HUD display 202 from, for example, transit agency server, supervisor MDT, or generally from elsewhere in system 10;
(f) FIG. 7c: shows a "canned" message that may be selected by a driver and sent in response to a message received by MDT 22;
(g) FIG. 8a: shows, for a demand response route, transit data/information that may be displayed on HUD display 202, including the next stop on a manifest, the time at which TIV 12 is to arrive (18:24) and the time before arrival (where red text may indicate TIV 12 is tracking late, blue early and black "on time" within some margin);
(h) FIG. 8b: shows a message relating to fixed demand response transit where TIV 12 is being asked to change their route slightly; this may be possible with short notice with HUD display 202 where a driver is more able to safely see and react to such message;
(i) FIG. 9a: shows a turn-by-turn navigation screen;
(j) FIG. 9b: shows other information that may be provided, including an alert about speed (which may be based on posted speeds for a street or a transit agency set limit for speed or other operating parameter such as jerkiness or speed based on load, and the like);
(k) FIG. 10: shows optional navigation views, which may include navigation (which may be akin to traditional turn-by-turn navigation, streetview (which may show Google™ Streetview™ data of the current or future location), and traffic (where traffic on upcoming streets is displayed); and
(l) FIGS. 11a-c:
(i) FIG. 11a: a trip or manifest event that is to be added to the manifest of TIV 12, that an operator may view on HUD display 202 and accept (to have added to their manifest) via and "okay" button;
(ii) FIG. 11b: a trip or manifest event that is to be removed from the manifest of TIV 12, that an operator may view on HUD display 202 and accept (to have removed from their manifest) via and "okay" button;
(iii) FIG. 11c: a trip or manifest event that is a no show (ie the rider was not present to be picked up for example), where the no show may be requested by TIV 12 operator and approved by dispatch prior to be noted as performed, removed from manifest, or otherwise dealt with in the manifest, where an "okay" button may complete the handling of the no show after the required approvals; and
(iv) FIG. 12: shows, for fixed route transit, transit data/information that may be displayed on HUD display 202, including a next timepoint (such as a stop on the current route) the time at which TIV 12 is to arrive (8:27), a route number, a driver, and the like. Items within frame 1202 may be displayed on HUD display 202, and tabs 1204 may be selected on MDT 22, with a selected tab being displayed in both frame 1202 and thus on HUD display 202.

It will be apparent to one of skill in the art that other configurations, hardware etc may be used in any of the foregoing embodiments of the products, methods, and systems of this invention. It will be understood that the specification is illustrative of the present invention and that other embodiments within the spirit and scope of the invention will suggest themselves to those skilled in the art. All references cited herein are incorporated by reference.

What is claimed is:

1. A system for heads-up display of transit data on a heads-up display on a transit industry vehicle, the system comprising:
   a projector, operably connected to a mobile data terminal, configured to produce an image on a transit industry vehicle heads-up display located on a windshield of the transit industry vehicle;
   a mobile data terminal, operably connected to a projector and operable via a mobile data terminal application residing thereon, and configured to:
   communicate a first set of transit data to a projector for display on the transit industry vehicle heads-up display; and
   display a second set of transit data on a mobile data terminal display;
   wherein the first set of transit data and the second set of transit data are the same when the transit industry vehicle is at rest and the first set of transit data is a subset of the second set of transit data when the vehicle is in motion.

2. A system for heads-up display of transit data on a heads-up display on a transit industry vehicle, the system comprising:
   a projector, operably connected to a mobile data terminal, configured to produce an image on a transit industry vehicle heads-up display located on a windshield of the transit industry vehicle;
   a mobile data terminal, operably connected to a projector and operable via a mobile data terminal application residing thereon, and configured to:
   communicate a first set of transit data to a projector for display on the transit industry vehicle heads-up display;
   display a second set of transit data on a mobile data terminal display; and
   enable a first set of one or more user inputs, received via the mobile data terminal by interacting with the first set of transit data, to access a first set of functionality of the mobile data terminal displayed on the transit industry vehicle heads-up display and to enable a second set of one or more user inputs, received via the mobile data terminal, to access a second set of functionality of the mobile data terminal displayed on the mobile data terminal display.

3. The system of claim 2 wherein the first set of user inputs comprises one or more of steering wheel buttons, located on a steering wheel of the transit industry vehicle, operator gestures, and operator voice commands.

4. The system of claim 2 wherein the first set of functionality and the second set of functionality are the same.

5. The system of claim 2 wherein the first set of functionality is a subset of the second set of functionality.

6. The system of claim 2 further comprising an operator application configured to enable a supervisor to specify the first set of functionality.

7. The system of claim 2 wherein the first set of functionality comprises one or more of performing a manifest event, receiving a text message, sending a text message, and viewing a picture of a manifest event location.

* * * * *